United States Patent
Liu

(10) Patent No.: US 7,637,835 B2
(45) Date of Patent: Dec. 29, 2009

(54) REDUCTION GEAR WITH INCREASED NUMBER OF MESHED TEETH

(75) Inventor: Chiu-Hsiang Liu, Taoyuan County (TW)

(73) Assignee: I Chin Gear Co., Ltd., Taoyuan County (TW)

( * ) Notice: Subject to any disclaimer, the term of this patent is extended or adjusted under 35 U.S.C. 154(b) by 369 days.

(21) Appl. No.: 11/822,769

(22) Filed: Jul. 10, 2007

(65) Prior Publication Data
US 2009/0017956 A1    Jan. 15, 2009

(51) Int. Cl.
*F16H 3/70* (2006.01)
*F16H 1/32* (2006.01)

(52) U.S. Cl. .................. 475/170; 475/176; 475/178
(58) Field of Classification Search ............... 475/164, 475/165, 169, 170, 176–178
See application file for complete search history.

(56) References Cited

U.S. PATENT DOCUMENTS

| 3,037,400 A * | 6/1962 | Sundt ............... 475/180 |
| 4,155,276 A * | 5/1979 | Fengler ............ 475/177 |
| 4,452,102 A * | 6/1984 | Shaffer ............ 475/169 |

* cited by examiner

*Primary Examiner*—Tisha D Lewis
(74) *Attorney, Agent, or Firm*—Bacon & Thomas, PLLC

(57) ABSTRACT

A reduction gear includes a case including a hollow cylinder having teeth on its inner wall; a ring gear having outer teeth meshed with the teeth of the cylinder, and inner teeth; and an eccentric gear assembly mounted in the cylinder and including a hollow eccentric shaft including rear and front eccentric sections, and first and second gears rotatably secured onto the rear and front eccentric sections respectively. Rotating an input shaft in a first speed will rotate the eccentric shaft to rotate the first and second gears around the inner teeth of the ring gear eccentrically, thereby rotating the output shaft in a second speed lower than the first speed. The invention has an increased number of meshed teeth between each of the first and second gears and the ring gear so as to distribute a radial load to more teeth in rotation.

2 Claims, 6 Drawing Sheets

REDUCTION GEAR WITH INCREASED NUMBER OF MESHED TEETH

BACKGROUND OF THE INVENTION

1. Field of Invention

The invention relates to reduction gears and more particularly to such a reduction gear having an increased number of meshed teeth.

2. Description of Related Art

One type of a conventional reduction gear is comprised of a plurality of gears of different diameters meshed together so that an output shaft fixed to, for example, the large gear can rotate in low speed at high torque. The other type of a conventional reduction gear is implemented as a planetary gearing.

Conventionally, there is only one tooth of a gear meshed with that of another gear in either type. That means radial load is mainly borne upon the very few meshed teeth in rotation. This has the drawback of reducing a useful life of the gearsets.

One proposal for eliminating the above drawback is increasing diameters of gears and subjecting the gears to hardening treatment. However, it inevitably will increase the size of gearbox and the manufacturing cost. Both are not desired.

There have been numerous suggestions in prior patents for reduction gear. For example, U.S. Pat. No. 6,832,970 discloses a reduction gear for a starter-generator of an internal combustion engine. Thus, continuing improvements in the exploitation of reduction gear are constantly being sought.

SUMMARY OF THE INVENTION

It is therefore one object of the invention to provide a reduction gear with reduced size.

It is another object of the invention to provide a reduction gear having an increased number of meshed teeth so that the reduction gear can be produced in a manufacturing process without involving hardening step so as to reduce the manufacturing cost.

The above and other objects, features and advantages of the invention will become apparent from the following detailed description taken with the accompanying drawings.

DETAILED DESCRIPTION OF THE INVENTION

Figure 1:
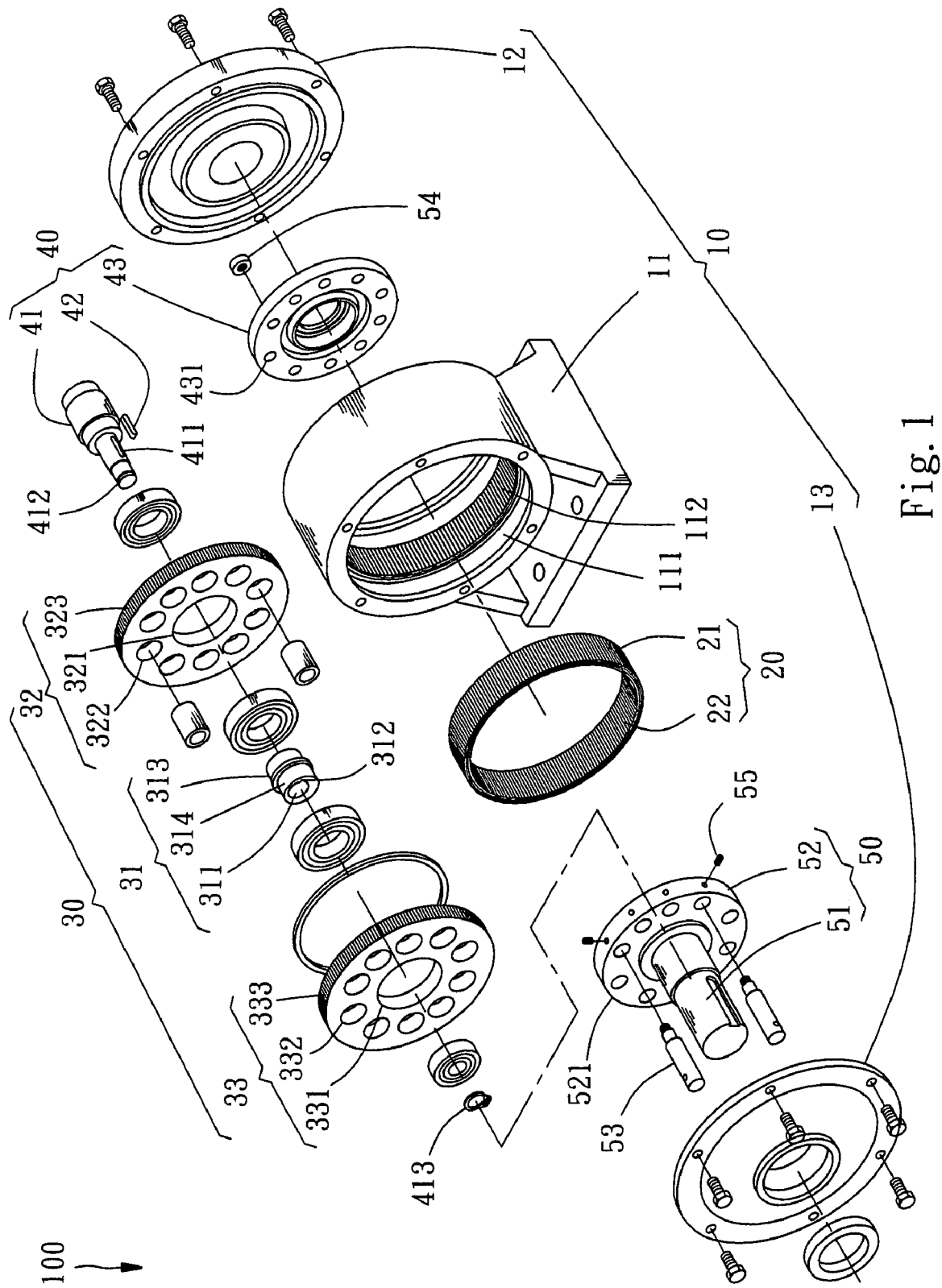
FIG. 1 is an exploded view of a preferred embodiment of reduction gear according to the invention.
Figure 2:
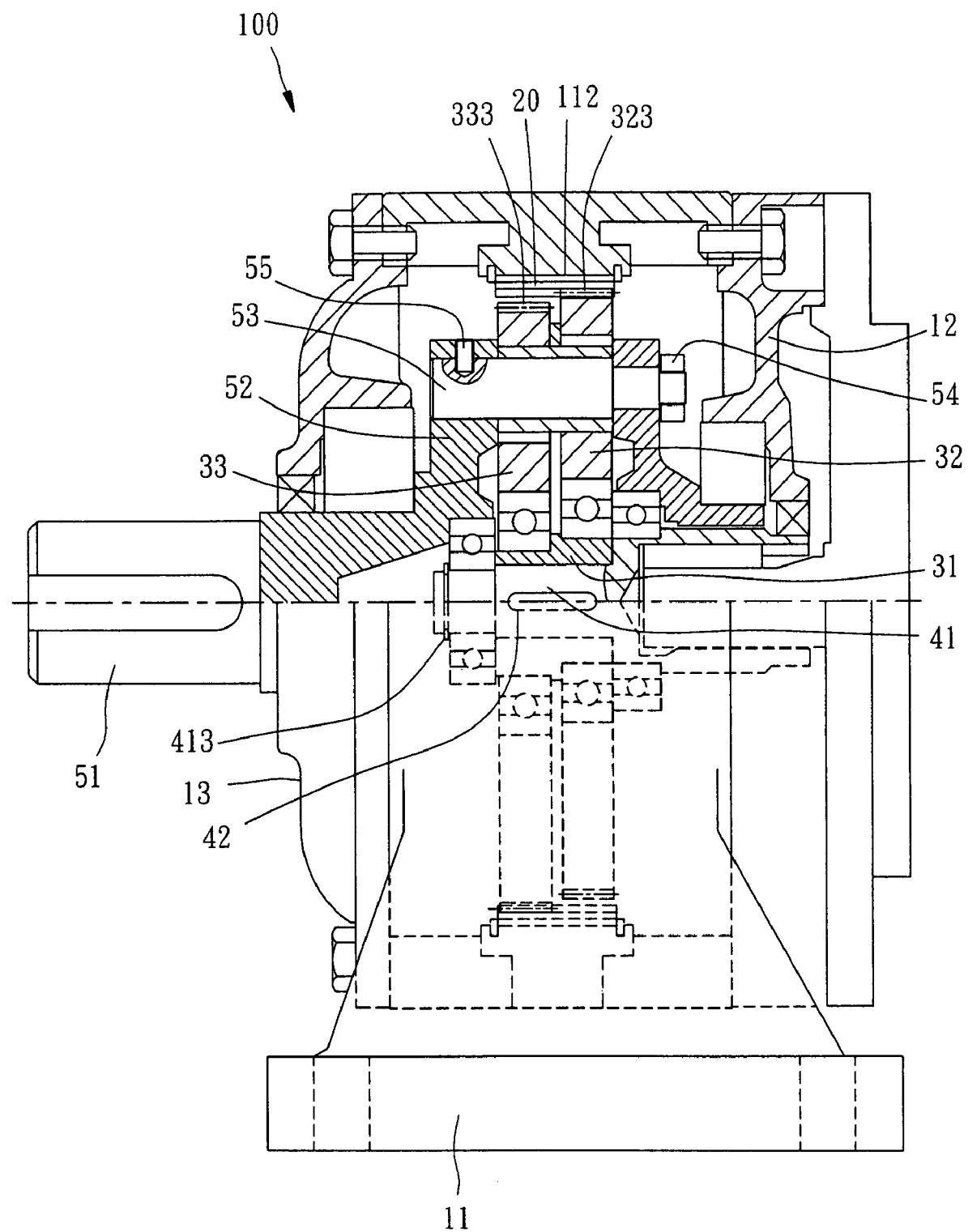
FIG. 2 is a side elevation in part section of the assembled reduction gear.

Referring to FIGS. 1 to 6, a reduction gear 100 in accordance with a preferred embodiment of the invention is shown. The reduction gear 100 comprises a case 10, a ring gear 20, an eccentric gear assembly 30, an input shaft assembly 40, and an output shaft assembly 50. Each component is discussed in detail below. The case 10 comprises a fixed seat 11 having a hollow cylinder 111 thereon, and teeth 112 formed on an annular inner wall of the cylinder 111; a rear cover 12 having a central hole; and a front cover 13 having a central hole.

The ring gear 20 has an outer toothed section 21 meshed with the teeth 112, and an inner toothed section 22. The eccentric gear assembly 30 comprises an eccentric shaft 31 including a lengthwise bore 311, a lengthwise groove 312 on an inner wall of the bore 311, a first eccentric section 313 in the rear, and a second eccentric section 314 in the front being spaced from the first eccentric section 313 by an annular flange (not numbered); a first gear 32 having a central through hole 321, an annular toothed section 323 on an outer surface, a plurality of apertures 322 equally spaced around the through hole 321 and between the through hole 321 and the toothed section 323; and a second gear 33 having a central through hole 331, an annular toothed section 333 on an outer surface, a plurality of apertures 332 equally spaced around the through hole 331 and between the through hole 331 and the toothed section 333. The second gear 33 is rotatably secured onto the second eccentric section 314 by mounting a bearing between an inner wall of the through hole 331 and the second eccentric section 314. The first gear 32 is rotatably secured onto the first eccentric section 313 by mounting a bearing between an inner wall of the through hole 321 and the first eccentric section 313. The eccentric gear assembly 30 is mounted in the cylinder 111 with the spaced toothed sections 323, 333 being meshed with the inner toothed section 22.

The input shaft assembly 40 comprises a staged input shaft 41 having an annular trough 412 on a front end and a keyway 411 behind the trough 412; a key 42 partially put into the keyway 411; and an abutment ring 43 having a plurality of apertures 431 equally spaced around its central through hole (not numbered) and between its through hole and its periphery. The input shaft 41 is inserted through the bore 311 of the eccentric shaft 31 with the exposed portion of the key 42 put into the groove 312, thereby holding the input shaft 41 and the eccentric shaft 31 together. A C-shaped ring 413 is fitted in the trough 412 disposed in front of the second gear 33 to assemble the input shaft 41 and the eccentric gear assembly 30 together. The abutment ring 43 is secured around the input shaft 41 by mounting a bearing between an inner wall of the through hole of the abutment ring 43 and a rear enlargement of the input shaft 41. At this fastened position, the apertures 322 are aligned with the apertures 531.

The output shaft assembly 50 comprises a front staged output shaft 51 having a keyway (not numbered), and a ring plate 52 fixedly mounted on a rear end of the output shaft 51 and having a plurality of apertures 521 equally spaced around its center and between its center and periphery. The output shaft assembly 50 is mounted onto a front surface of the second gear 33 with the apertures 521 being aligned with the apertures 332. A plurality of pins 53 are loosely inserted through the apertures 521, 332, 322 and 431 to have its threaded ends threadedly secured to a plurality of nuts 54. Moreover, a plurality of screws 55 are driven through a peripheral edge of the output shaft 51 into the pins 53. As a result, the output shaft assembly 50 and the eccentric gear assembly 30 are fastened together. That is, the eccentric gear assembly 30 is rotatably mounted in the case 10, and the eccentric gear assembly 30 has its front end fixedly secured to the output shaft assembly 50 and its rear end fixedly secured to the input shaft assembly 40. Finally, threadedly securing the front cover 13 to a front edge of the cylinder 111 and threadedly securing the rear cover 12 to an rear edge of the cylinder 111 respectively to assemble the complete reduction gear 100 with the output shaft 51 extending out of the front cover 13 and the input shaft 41 extending out of the rear cover 12.

Figure 3:
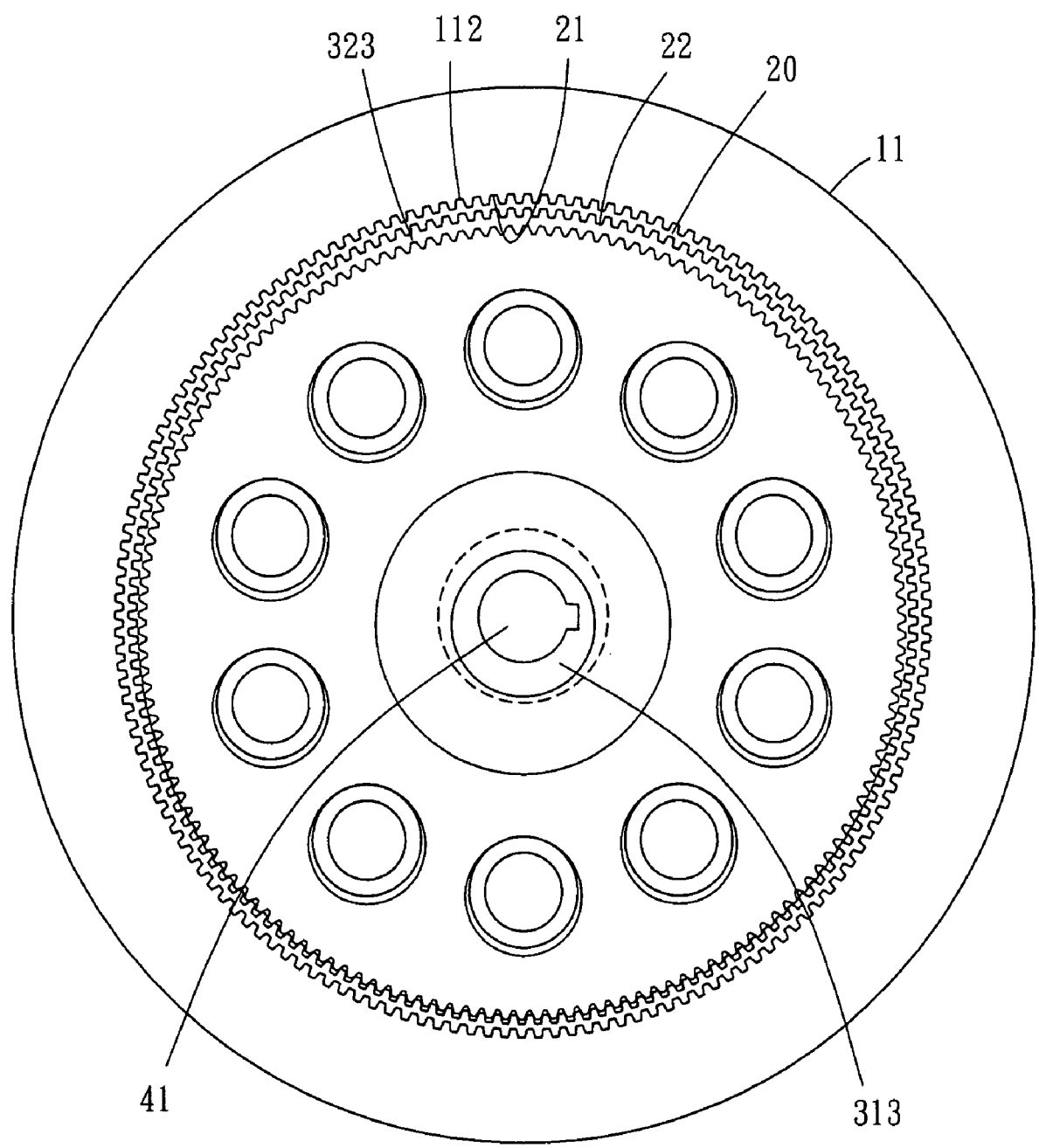
FIG. 3 is a schematic front view of FIG. 2 for showing a gear connection of the ring gear and the first gear in an inoperative position.
Figure 4:
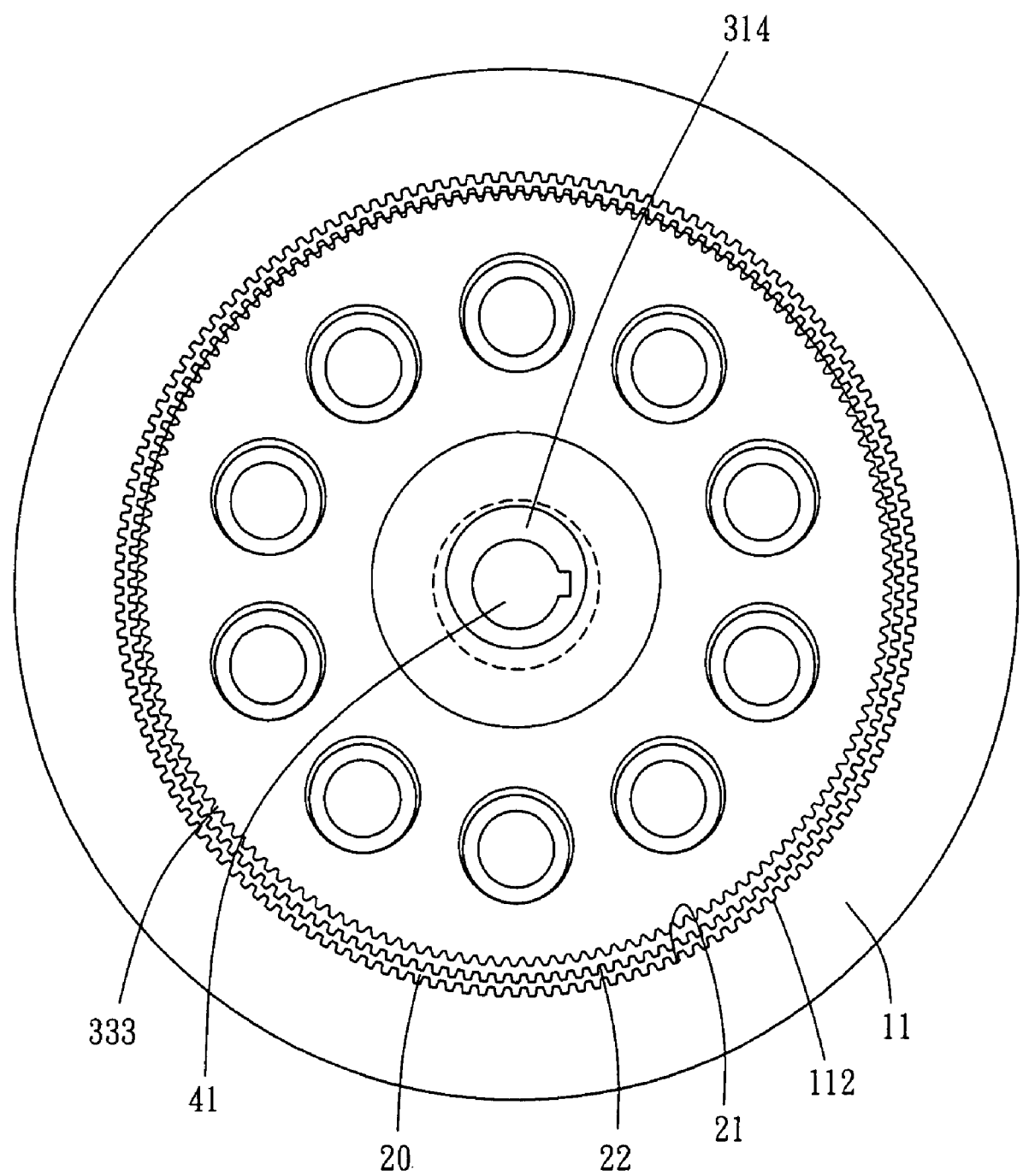
FIG. 4 is a schematic front view of FIG. 2 for showing a gear connection of the ring gear and the second gear in an inoperative position.

Referring to FIGS. 3 and 4, about one sixth of the number of teeth of the toothed section 323 of the first gear 32 is meshed with about the same number of teeth of the inner toothed section 22 of the ring gear 20, and about one sixth of the number of teeth of the toothed section 333 of the second gear 33 is meshed with about the same number of teeth of the inner toothed section 22 of the ring gear 20 respectively. This has the benefit of distributing a radial load to more teeth in rotation. Hence, the invention does not need to increase diameters of gears and subject the gears to hardening treatment.

Figure 5:
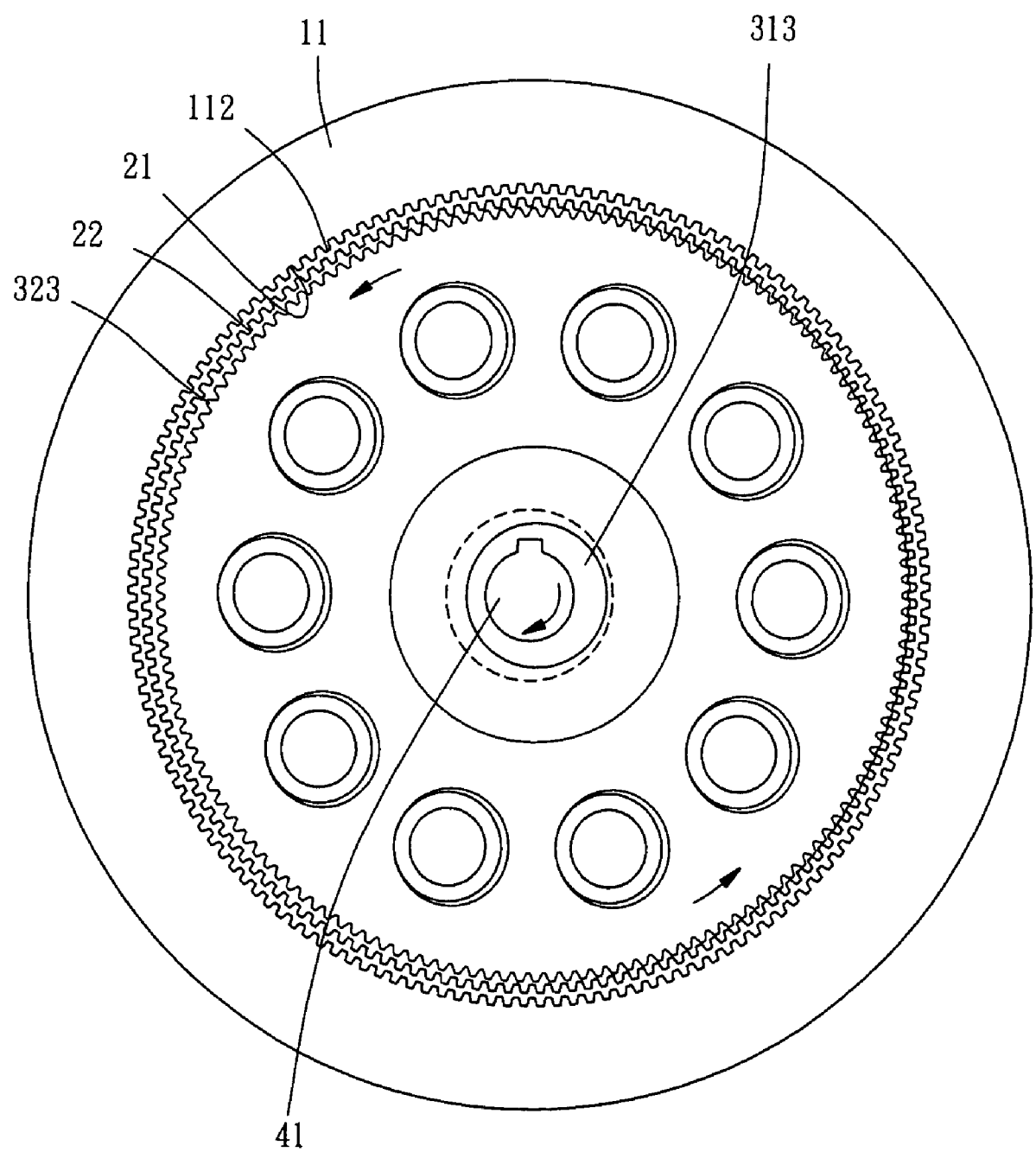
FIG. 5 is a view similar to FIG. 3 where the ring gear and the first gear are in an operative position.
Figure 6:
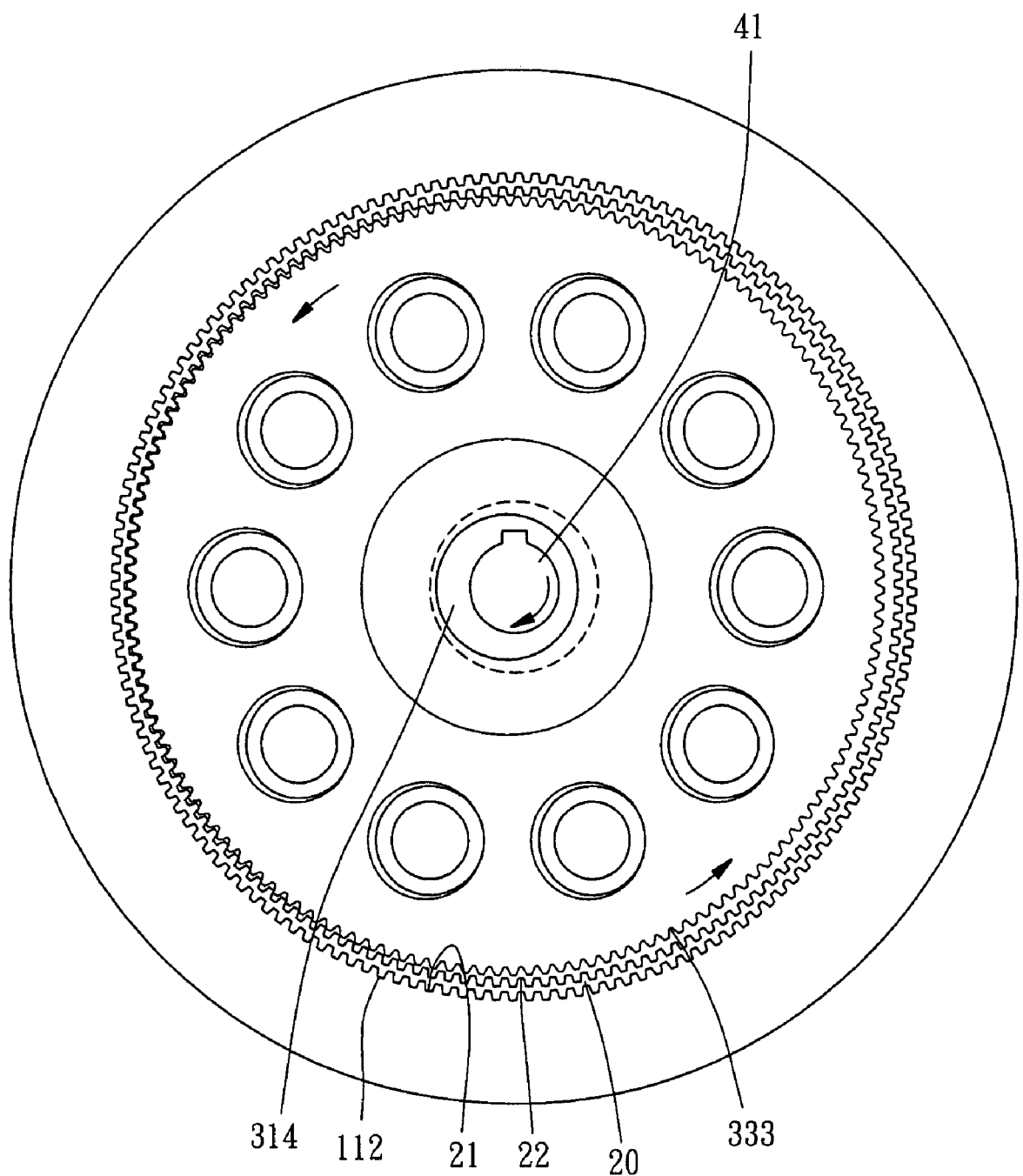
FIG. 6 is a view similar to FIG. 4 where the ring gear and the second gear are in an operative position.

Referring to FIGS. 5 and 6, an operation of the invention will be described in detail below. The input shaft 41 rotates in high speed at low torque and the output shaft 51 rotates in low speed at high torque through the speed reduction mechanism of the reduction gear 100, i.e., the eccentric shaft 31 rotates eccentrically to cause both the first and second gears 32, 33 to rotate around the inner toothed section 22 cyclically. Also, the apertures 521, 332, 322, and 431 rotate eccentrically around the pins 53. For example, each of the toothed sections 323, 333 has 150 teeth and the inner toothed section 22 has 152 teeth to be adapted to mesh therewith. Hence, 150 revolutions of the input shaft 41 will result in two revolutions of the output shaft 51 (i.e., the toothed sections 323, 333 rotate two revolutions relative to the inner toothed section 22).

Note that the ring gear 20 is required to be slightly deformed prior to mounting around both the first gear 32 and the second gear 33. While the above embodiment discussing two gears disposing at opposite ends of the ring gear 20, it is apparent that more than two gears disposing at either end of the ring gear 20 is possible as contemplated by the invention.

While the invention herein disclosed has been described by means of specific embodiments, numerous modifications and variations could be made thereto by those skilled in the art without departing from the scope and spirit of the invention set forth in the claims.

What is claimed is:

1. A reduction gear apparatus comprising:
    a case comprising a hollow cylinder having teeth on its inner wall, a rear cover having a central hole, and a front cover having a central hole;
    a ring gear having outer teeth meshed with the teeth of the cylinder, and inner teeth;
    an eccentric gear assembly mounted in the cylinder and comprising a hollow eccentric shaft including a lengthwise groove on an inner wall, a rear eccentric section, and a front eccentric section; a hollow first gear having outer teeth meshed with the inner teeth of the ring gear, and a plurality of equally spaced apertures between the outer teeth thereof and its central hole wherein the first gear is rotatably secured onto the rear eccentric section; and a hollow second gear having outer teeth meshed with the inner teeth of the ring gear, and a plurality of equally spaced apertures between the outer teeth thereof and its central hole wherein the second gear is rotatably secured onto the front eccentric section;
    an input shaft assembly comprising a C-shaped ring, a staged input shaft having a front annular trough and an intermediate keyway; a key partially put into the keyway; and an abutment ring having a plurality of equally spaced apertures between its central hole and its periphery wherein the input shaft is inserted through the eccentric shaft with the exposed portion of the key put into the groove for holding the input shaft and the eccentric shaft together, the C-shaped ring is fitted in the trough to fasten the input shaft in the eccentric gear assembly, and the abutment ring is rotatably secured onto the input shaft; and
    an output shaft assembly mounted onto a front surface of the second gear and comprising a front staged output shaft, a ring plate on a rear end of the output shaft and having a plurality of apertures equally spaced between its center and its periphery, a plurality of pins loosely inserted through the apertures of the ring plate, the apertures of the second gear, the apertures of the first gear, and the apertures of the abutment ring to have its ends threadedly secured to a plurality of nuts; and a plurality of fasteners driven through a peripheral edge of the output shaft into the pins for fastening;
    wherein a front edge of the cylinder is threadedly secured to the front cover and a rear edge of the cylinder is threadedly secured to the rear cover with the output shaft extending out of the front cover and the input shaft extending out of the rear cover respectively;
    wherein a first predetermined number of teeth of the outer teeth of the first gear are meshed with a second predetermined number of teeth of the inner teeth of the ring gear, and a third predetermined number of teeth of the outer teeth of the second gear are meshed with a fourth predetermined number of teeth of the inner teeth of the ring gear; and
    wherein in response to rotating the input shaft in a first speed, the eccentric shaft rotates eccentrically to rotate the first and second gears around the inner teeth of the ring gear eccentrically, thereby rotating the apertures of the ring plate, the apertures of the second gear, the apertures of the first gear, and the apertures of the abutment ring around the pins eccentrically, and rotating the output shaft in a second speed which is lower than the first speed.

2. The reduction gear apparatus of claim 1, wherein the first predetermined number of teeth is about one sixth of a total number of teeth of the outer teeth of the first gear, the second predetermined number of teeth is about one sixth of a total number of teeth of the inner teeth of the ring gear, the third predetermined number of teeth is about one sixth of a total number of teeth of the outer teeth of the second gear, and the fourth predetermined number of teeth is about one sixth of a total number of teeth of the inner teeth of the ring gear.

* * * * *